United States Patent
Geng et al.

(10) Patent No.: US 10,523,430 B2
(45) Date of Patent: Dec. 31, 2019

(54) INFORMATION PROCESSING METHOD AND APPARATUS

(71) Applicant: Huawei Technologies Co., Ltd., Shenzhen (CN)

(72) Inventors: Wei Geng, Shenzhen (CN); Chen-Xiong Zhang, Plano, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/392,915

(22) Filed: Apr. 24, 2019

(65) Prior Publication Data

US 2019/0253246 A1  Aug. 15, 2019

Related U.S. Application Data

(63) Continuation of application No. PCT/CN2016/103229, filed on Oct. 25, 2016.

(51) Int. Cl.
*H04L 9/08* (2006.01)
*H04B 10/70* (2013.01)

(52) U.S. Cl.
CPC ........... *H04L 9/0858* (2013.01); *H04B 10/70* (2013.01); *H04L 9/08* (2013.01)

(58) Field of Classification Search
CPC .......... H04L 9/0858; H04L 9/08; H04B 10/70
See application file for complete search history.

(56) References Cited

U.S. PATENT DOCUMENTS

| | | | | |
|---|---|---|---|---|
| 2007/0071244 A1* | 3/2007 | LaGasse | ................ | H04B 10/70 380/278 |
| 2008/0292099 A1* | 11/2008 | Gisin | .................... | H04L 9/0858 380/29 |
| 2014/0099104 A1* | 4/2014 | Peters | .................... | H04B 10/70 398/25 |

(Continued)

FOREIGN PATENT DOCUMENTS

| | | | |
|---|---|---|---|
| CN | 103441819 A | 12/2013 | |
| CN | 105049198 A | 11/2015 | |

(Continued)

OTHER PUBLICATIONS

Machine Translation and Abstract of Chinese Publication No. CN103441819, Dec. 11, 2013, 20 pages.

(Continued)

*Primary Examiner* — Joseph P Hirl
*Assistant Examiner* — Thomas A Gyorfi
(74) *Attorney, Agent, or Firm* — Conley Rose, P.C.

(57) ABSTRACT

An information processing method, includes calculating, using a first station, an estimated ratio of a quantity of pulses affected by a photon-number splitting (PNS) attack including a multi-photon in the pulses to a total quantity of the pulses, performing, using the first station, error correction processing on key information based on the estimated ratio to obtain a shared key of the first station and a second station when the estimated ratio is less than a preset threshold. Hence, a degree to which the photon is affected by the PNS attack can be estimated in order to perform error correction on the key information, thereby improving security of a key distribution.

20 Claims, 4 Drawing Sheets

(56) References Cited

U.S. PATENT DOCUMENTS

2015/0236791 A1* 8/2015 Nordholt ............... H04B 10/70
398/184
2016/0149700 A1 5/2016 Fu et al.

FOREIGN PATENT DOCUMENTS

CN 105553648 A 5/2016
WO 2010151105 A1 12/2010

OTHER PUBLICATIONS

Machine Translation and Abstract of Chinese Publication No. CN105049198, Nov. 11, 2015, 12 pages.
Hwang, W., "Quantum Key Distribution with High Loss: Toward Global Secure Communication," Physical Review Letters, vol. 91, No. 5, Aug. 1, 2003, 4 pages.
Scarani, V., et al., "The security of practical quantum key distribution," Reviews of Modern Physics, vol. 81, Jul.-Sep. 2009, 50 pages.
Gottesman, D., et al, "Security of Quantum Key Distribution with Imperfect Devices," ISIT, Jun. 27-Jul. 2, 2004, 1 page.
Wang, X., "Beating the Photon-Number-Splitting Attack in Practical Quantum Cryptography," Physical Review Letters, PRL 94, 230503, Jun. 17, 2005, 4 pages.
Foreign Communication From a Counterpart Application, PCT Application No. PCT/CN2016/103229, English Translation of International Search Report dated Jul. 19, 2017, 2 pages.
Foreign Communication From a Counterpart Application, PCT Application No. PCT/CN2016/103229, English Translation of Written Opinion dated Jul. 19, 2017, 4 pages.

* cited by examiner

INFORMATION PROCESSING METHOD AND APPARATUS

CROSS-REFERENCE TO RELATED APPLICATIONS

This application is a continuation application of International Patent Application No. PCT/CN2016/103229 filed on Oct. 25, 2016, which is hereby incorporated by reference in its entirety.

TECHNICAL FIELD

The present disclosure relates to the field of quantum communications technologies, and in particular, to an information processing method and apparatus.

BACKGROUND

Quantum key distribution (QKD) has unconditional security according to the no-cloning theorem of quantum bits. However, a relatively short communication distance has been always limiting promotion of a practical application of the QKD. In a QKD protocol (BBM92 protocol) based on an entangled state, a photon source at a communication midpoint separately sends one photon to each of two communications parties, and therefore, a communication distance between the two communications parties can be extended to twice as much as that of a conventional BB84 protocol. In practice, however, because it is difficult to implement a perfect entangled photon source, a nonlinear process such as parametric down conversion (PDC) or four-wave mixing (FWM) is generally used to generate one pair of entangled photons in one pulse at a specific probability, or the photon source generates a plurality of pairs of mutually entangled photons in one pulse at a specific probability, and two entangled photons in the photon pair are sent to the two communications parties separately.

However, this phenomenon can cause an eavesdropper (also referred to as Eve) to use a photon-number splitting (PNS) attack to steal one or more of the plurality of pairs of mutually entangled photons without being noticed in order to obtain information about a key of the two communications parties. This greatly reduces a security transmission distance and a generation rate of a security key of the QKD system. A detailed stealing process of Eve is as follows.

(a) Eve performs photon number measurement on pulses sent by Charlie (photon source) to the two communications parties. For pulses that include a plurality of photons, Eve reserves some photons, and then sends remaining photons to the two communications parties through a channel with an extremely low loss.

(b) After communication ends, the two communications parties announce a base of their measurement through a common channel, and in this case, Eve performs measurement, using a base that is the same as that used by the two communications parties, on the photons reserved by Eve in order to obtain a part of the key.

(c) In an extreme condition (in one pulse, a probability at which a plurality of photon pairs is greater than a channel loss), Eve can block all single-photon pulses, and all multi-photon pulses are affected by the PNS attack. In this way, key of the two communication parties are all generated by the multi-photon pulse, and the two communications parties cannot discover a communication exception. In this case, Eve can have the entire key.

It can be learned from the above, for long-distance communications parties, security of an entangled state QKD communication manner is extremely low, and the key can be easily stolen by the eavesdropper.

SUMMARY

Embodiments of the present disclosure provide an information processing method and apparatus to estimate a degree to which a photon in an entangled state QKD is affected by a PNS attack in order to perform error correction on key information, thereby improving security of key distribution.

According to a first aspect of the present disclosure, an information processing method is provided. The information processing method is applied to entangled state QKD communication between a first station and a second station, and includes receiving, by the first station, a plurality of pulses sent by a photon source, where the plurality of pulses include a signal state pulse and a decoy state pulse, a probability distribution of a photon number in the signal state pulse and a probability distribution of a photon number in the decoy state pulse are different, and photons in the plurality of pulses carry key information, calculating, by the first station, an estimated ratio of a quantity of pulses that are affected by a PNS attack and that include a multi-photon in the plurality of pulses to a total quantity of the plurality of pulses, and if the estimated ratio is less than a preset threshold, performing, by the first station, error correction processing on the key information based on the estimated ratio to obtain a shared key of the first station and the second station.

In a possible design, if the estimated ratio is greater than the preset threshold, the first station discards the key information carried by the photons in the plurality of pulses.

In another possible design, calculating, by the first station, an estimated ratio of a quantity of pulses that are affected by a PNS attack and that include a multi-photon in the plurality of pulses to a total quantity of the plurality of pulses includes calculating, by the first station, a first detection gain of a signal state pulse in the plurality of pulses, where the first detection gain is a ratio of a quantity of pulses of a photon that are detected by the first station and the second station in a same signal state pulse to a total quantity of signal state pulses sent by the photon source, calculating, by the first station, a second detection gain of a decoy state pulse in the plurality of pulses, where the second detection gain is a ratio of a quantity of pulses of a photon that are detected by the first station and the second station in a same decoy state pulse to a total quantity of decoy state pulses sent by the photon source, and calculating, by the first station, based on the first detection gain, the second detection gain, a probability of generating a plurality of photon pairs in the signal state pulse, and a probability of generating a plurality of photon pairs in the decoy state pulse, the estimated ratio of the quantity of pulses that are affected by the PNS attack and that include the multi-photon in the plurality of pulses to the total quantity of the plurality of pulses.

In still another possible design, before the calculating, by the first station, a first detection gain in the plurality of pulses, the method further includes measuring, by the first station, the received plurality of pulses using an orthogonal basis vector in order to determine a first pulse identifier of a photon obtained by the first station through measurement in the received plurality of pulses, obtaining, by the first station, a second pulse identifier of the photon obtained by the second station through measurement in the received plurality of pulses, and determining, by the first station, an identifier of a signal state pulse and an identifier of a decoy state pulse that are in the plurality of pulses.

Optionally, calculating, by the first station, a first detection gain of a signal state pulse in the plurality of pulses includes determining, by the first station, based on the first pulse identifier, the second pulse identifier, and the identifier of the signal state pulse in the plurality of pulses, a quantity of pulses of the photon that are detected by the first station and the second station in a same signal state pulse, and calculating, by the first station, the first detection gain of the signal state pulse in the plurality of pulses based on the quantity of pulses of the photon that are detected by the first station and the second station in the same signal state pulse and a quantity of pulses of the signal state pulses in the plurality of pulses.

Optionally, calculating, by the first station, a second detection gain of a signal state pulse in the plurality of pulses includes determining, by the first station, based on the first pulse identifier, the second pulse identifier, and the identifier of the decoy state pulse in the plurality of pulses, a quantity of pulses of the photon that are detected by the first station and the second station in a same decoy state pulse, and calculating, by the first station, the second detection gain of the decoy state pulse in the plurality of pulses based on the quantity of pulses of the photon that are detected by the first station and the second station in the same decoy state pulse and a quantity of pulses of the decoy state pulses in the plurality of pulses.

In still another possible design, obtaining, by the first station, a second pulse identifier of the photon obtained by the second station through measurement in the received plurality of pulses includes listening, by the first station, to the second pulse identifier that is of the photon obtained by the second station through measurement in the received plurality of pulses and that is notified through a classic channel.

Optionally, the method further includes notifying, by the first station, the first pulse identifier to the second station through the classic channel.

In still another possible design, the signal state pulse is generated by performing pulse pumping on nonlinear material by the photon source using a first pumping intensity, and the decoy state pulse is generated by performing pulse pumping on the nonlinear material by the photon source using a second pumping intensity.

According to a second aspect of the present disclosure, an information processing apparatus is provided, and is applied to a first station, where entangled state QKD communication is performed between the first station and a second station. The information processing apparatus includes a receiving unit, a calculation unit, and a processing unit. The receiving unit is configured to receive a plurality of pulses sent by a photon source, where the plurality of pulses include a signal state pulse and a decoy state pulse, a probability distribution of a photon number in the signal state pulse and a probability distribution of a photon number in the decoy state pulse are different, and photons in the plurality of pulses carry key information, the calculation unit is configured to calculate an estimated ratio of a quantity of pulses that are affected by a PNS attack and that include a multi-photon in the plurality of pulses to a total quantity of the plurality of pulses, and the processing unit is configured to perform error correction processing on the key information based on the estimated ratio to obtain a shared key of the first station and the second station if the estimated ratio is less than a preset threshold.

According to a third aspect of the present disclosure, an information processing apparatus is provided, and is applied to a first station, and entangled state QKD communication is performed between the first station and a second station. The information processing apparatus includes a transceiver, a processor, and a memory. The memory is configured to store a computer program instruction, and the processor is coupled to the memory, and is configured to read the computer program instruction stored in the memory, and perform the method provided in the first aspect.

According to a fourth aspect of the present disclosure, a program storage medium is further provided, and when a program stored in the program storage medium is executed, the method provided in the first aspect may be implemented.

In embodiments of the present disclosure, the first station receives the plurality of pulses sent by the photon source, where the plurality of pulses include the signal state pulse and the decoy state pulse, the probability distribution of the photon number in the signal state pulse and the probability distribution of the photon number in the decoy state pulse are different, and the photons in the plurality of pulses carry the key information. The first station estimates the estimated ratio of the quantity of pulses that are affected by the PNS attack and that include the multi-photon in the plurality of pulses to the total quantity of the plurality of pulses. If the estimated ratio is less than the preset threshold, the first station performs error correction processing on the key information based on the estimated ratio, to obtain the shared key of the first station and the second station. In this manner, the degree to which the photon is affected by the PNS attack can be estimated in order to perform error correction on the key information, thereby improving security of the key distribution.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The "calculation" mentioned in the embodiments of the present disclosure may be a general estimation method.

Figure 1:
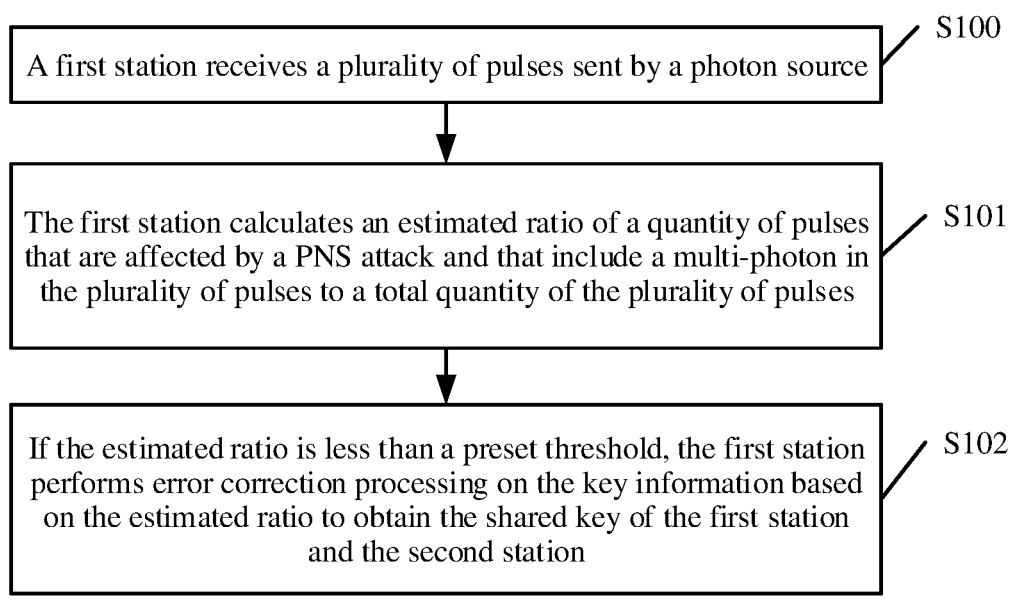
FIG. 1 is a schematic flowchart of an information processing method according to an embodiment of the present disclosure.

FIG. 1 is a schematic flowchart of an information processing method according to an embodiment of the present disclosure. The information processing method in this embodiment of the present disclosure may be applied to entangled state QKD communication between a first station and a second station. As shown in the figure, the information processing method in this embodiment includes steps S100 to S102.

Step S100: The first station receives a plurality of pulses sent by a photon source, where the plurality of pulses include a signal state pulse and a decoy state pulse, a probability distribution of a photon number in the signal state pulse and a probability distribution of a photon number in the decoy state pulse are different, and photons in the plurality of pulses carry key information.

In this embodiment of the present disclosure, the photon source used in this embodiment of the present disclosure includes but is not limited to a non-ideal entangled photon source based on principles such as PDC, and FWM, for example, the photon source may be another type of entangled photon source generated using a principle such as a quantum dot biexciton. This embodiment of the present disclosure is applicable to a QKD system in which the entangled photon source is in the middle of two communications parties, or the photon source is located in one of two communications stations. In this embodiment of the present disclosure, that the photon source is in the middle of the two communications parities is used as an example for description, which certainly does not constitute a limitation on the present disclosure.

In this embodiment of the present disclosure, the plurality of pulses include the signal state pulse and the decoy state pulse, and a quantity of the decoy state pulses may be one or more, and power for pumping each decoy state pulse may be randomly selected. The probability distribution of the photon number in the signal state pulse and the probability distribution of the photon number in the decoy state pulse are different. In the signal state pulse, a probability of occurrence of a single photon is usually greater than that of a multi-photon, and in the decoy state pulse, the probability of the occurrence of the single photon is less than that of the multi-photon. For a pulse that includes a plurality of photons, an attacker Eve reserves some of the photons, and then sends the remaining photons to the two communications parties through a channel with an extremely low loss. The two communications parties in this embodiment of the present disclosure are the first station and the second station. The photon of the signal state pulse and/or the decoy state pulse in the plurality of pulses carries the key information.

Herein, an example that a quantity of decoy state pulses is one is used for description. There is a quantum channel and a classical channel between the first station and the second station. In a middle point of a channel, there is a reliable station (Charlie). Charlie is a photon source, and Charlie may select two pumping intensities ($P_\mu$, $P_{\mu'}$) to perform pulse pumping on nonlinear material, where a pulse generated by the pumping intensity $P_\mu$ is the signal state pulse, and a pulse generated by the pumping intensity $P_{\mu'}$ is the decoy state pulse. At any moment, a specific pumping intensity is completely randomly selected by Charlie. Then, Charlie separately sends a generated entangled photon in the pulse to the first station and the second station through the quantum channel.

Step S101: The first station calculates an estimated ratio of a quantity of pulses that are affected by a PNS attack and that include the multi-photon in the plurality of pulses to a total quantity of the plurality of pulses.

In this embodiment of the present disclosure, the first station and the second station separately and randomly use two mutually orthogonal basis vectors to perform measurement on the received pulse in order to determine whether the photon is detected in the pulse. After the communication ends, Charlie announces signal state pulses and the decoy state pulses in the sent pulses, that is, announces the pumping intensity that is used by each pulse. The first station and the second station calculate a detection gain of the signal state pulse and a detection gain of the decoy state pulse $Q_\mu$, $Q_{\mu'}$, based on the announced result. Using the foregoing parameters, the first station and the second station can estimate a ratio of pulses that are not affected by the PNS attack of an eavesdropper, remove information that may be obtained by Eve in information processing such as privacy amplification, and finally obtain a secure shared key of the first station and the second station.

According to the QKD method based on the decoy state and the entangled state that is provided in this embodiment of the present disclosure, the decoy state pulse is introduced using different pumping intensities. Because in addition to different probability distributions of the photon number, other properties (polarization, frequency, pulse width, and the like.) of the decoy state pulse and the signal state pulse are completely the same, the eavesdropper cannot distinguish between the decoy state pulse and the signal state pulse, and can only perform the same PNS attack on the decoy state pulse and the signal state pulse. Using the gain of the decoy state pulse, we can estimate a degree of the entire PNS attack, that is, set an appropriate lower limit for the "a ratio of a quantity of pulses that are not affected by the PNS attack", instead of simply considering all multi-photon pulses as being affected by the PNS attack. In the subsequent information processing, especially in the privacy amplification, we can avoid losing unnecessary information. Therefore, a maximum generation rate and a longest communication distance of a security key are improved, which has relatively strong application value.

Step S102: If the estimated ratio is less than a preset threshold, the first station performs error correction processing on the key information based on the estimated ratio to obtain the shared key of the first station and the second station.

In this embodiment of the present disclosure, if the estimated ratio of the quantity of pulses that are attacked by the PNS to the total quantity of the plurality of pulses is less than the preset threshold, it indicates that the PNS attack degree is acceptable. The shared key of the first station and the second station may be obtained by performing error correction processing on the received key information.

In this embodiment of the present disclosure, the first station receives the plurality of pulses sent by the photon source, where the plurality of pulses include the signal state pulse and the decoy state pulse, the probability distribution of the photon number in the signal state pulse and the probability distribution of the photon number in the decoy state pulse are different, and the photons in the plurality of pulses carry the key information. The first station calculates the estimated ratio of the quantity of pulses that are affected by the PNS attack and that include the multi-photon in the plurality of pulses to the total quantity of the plurality of pulses. If the estimated ratio is less than the preset threshold, the first station performs error correction processing on the key information based on the estimated ratio, to obtain the shared key of the first station and the second station. In this manner, the degree to which the photon is affected by the PNS attack in the entangled state QKD can be estimated in order to perform error correction on the key information, thereby improving security of the key distribution.

Figure 2:
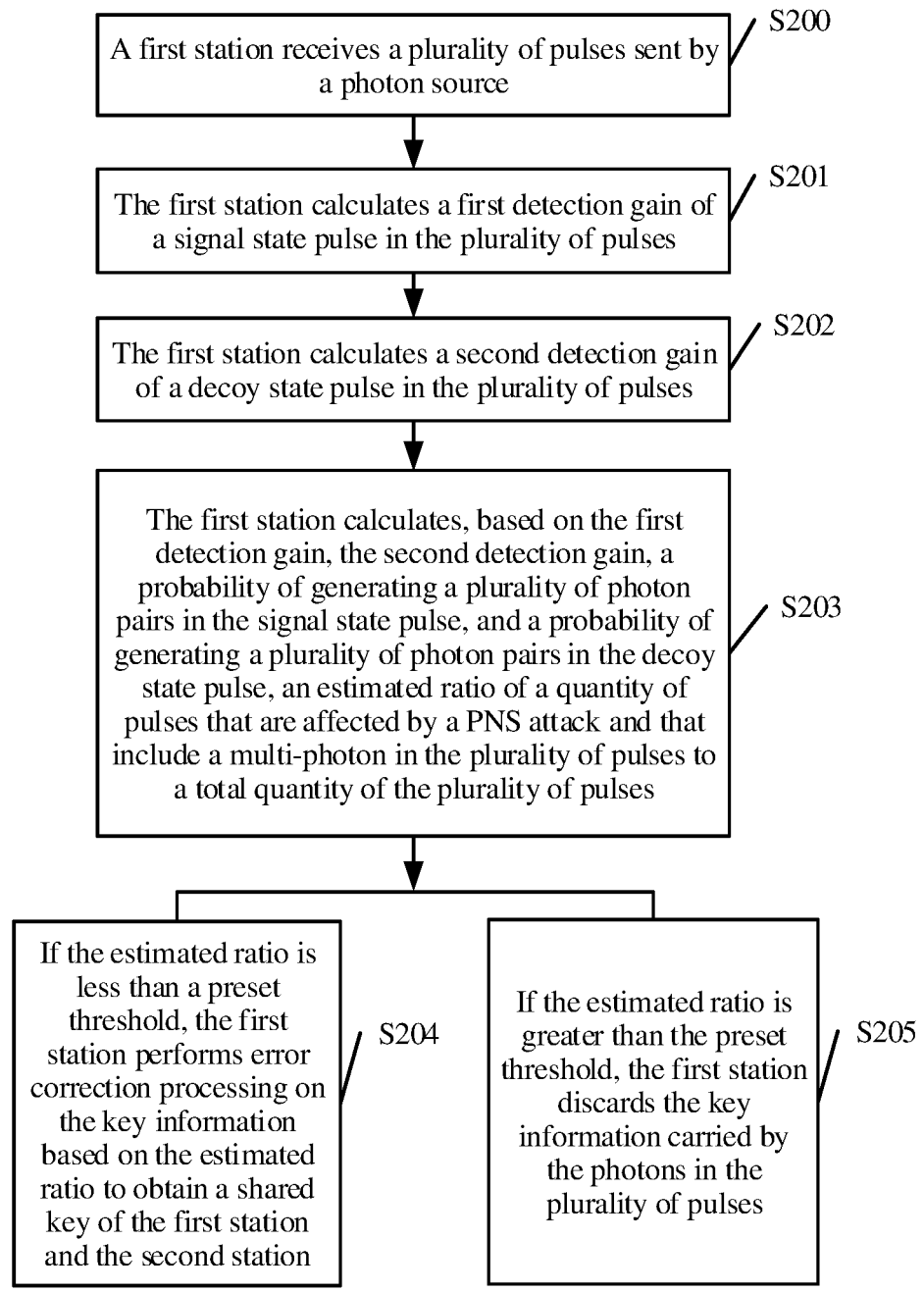
FIG. 2 is a schematic flowchart of another information processing method according to an embodiment of the present disclosure.

FIG. 2 is a schematic flowchart of another information processing method according to an embodiment of the present disclosure. The information processing method in this embodiment of the present disclosure is optimized based on the information processing method in FIG. 1. As shown in the figure, the information processing method in this embodiment of the present disclosure includes steps S200 to S205.

Step S200: A first station receives a plurality of pulses sent by a photon source, where the plurality of pulses include a signal state pulse and a decoy state pulse, a probability distribution of a photon number in the signal state pulse and a probability distribution of a photon number in the decoy state pulse are different, and photons in the plurality of pulses carry key information.

For step S200 in this embodiment of the present disclosure, refer to step S100 in the embodiment in FIG. 1, and details are not described herein again.

Step S201: The first station calculates a first detection gain of a signal state pulse in the plurality of pulses, where the first detection gain is a ratio of a quantity of pulses of a photon that are detected by the first station and the second station in a same signal state pulse to a total quantity of signal state pulses sent by the photon source.

Step S202: The first station calculates a second detection gain of a decoy state pulse in the plurality of pulses, where the second detection gain is a ratio of a quantity of pulses of a photon that are detected by the first station and the second station in a same decoy state pulse to a total quantity of decoy state pulses sent by the photon source.

Step S203: The first station calculates based on the first detection gain, the second detection gain, a probability of generating a plurality of photon pairs in the signal state pulse, and a probability of generating a plurality of photon pairs in the decoy state pulse, an estimated ratio of a quantity of pulses that are affected by a PNS attack and that include a multi-photon in the plurality of pulses to a total quantity of the plurality of pulses.

In this embodiment of the present disclosure, a processing procedure of the first station is the same as a processing procedure of the second station, and the first detection gain of the signal state pulse in the plurality of pulses and the second detection gain of the decoy state pulse in the plurality of pulses are calculated, and a quantity of decoy state pulses may be one or more. In this embodiment of the present disclosure, an example that the quantity of decoy state pulses is one is used for description.

There is a quantum channel and a classic channel between the first station and the second station, and there is a reliable station (Charlie) in a middle point of the channel. Charlie may select two pumping intensities ($P_\mu$, $P_{\mu'}$) to perform pulse pumping on nonlinear material, where a pulse generated by the pumping intensity $P_\mu$ is the signal state pulse, and a pulse generated by the pumping intensity $P_{\mu'}$ is the decoy state pulse. At any moment, a specific pumping intensity is completely randomly selected by Charlie. Then, Charlie separately sends two generated entangled photons to the two communications parties through the quantum channel.

The first station and the second station separately and randomly select one of two orthogonal basis vectors to perform measurement on the received pulse in order to determine whether the pulse includes the photon. If the first station determines based on the measurement that a pulse includes the photon, a first pulse identifier of the pulse is recorded. If the second station determines based on the measurement that a pulse includes the photon, a second pulse identifier of the pulse is recorded. After the communication ends, the first station and the second station announce, through the classic channel, pulses in which the photon is detected by them separately (that is, announce, through the classical channel, pulse identifiers of the photon that are detected by them separately).

At the same time, Charlie uses the classical channel to announce the pumping intensity used by each pulse, and the first station and the second station may determine, based on the pumping intensity used by each pulse, the signal state pulses and the decoy state pulses in the plurality of pulses. Therefore, the first station and the second station may determine, based on the foregoing first pulse identifier, the second pulse identifier, and an identifier of the signal state pulse in the plurality of pulses, the quantity of pulses of the photon that are detected by the first station and the second station in the same signal state pulse. Further, the first detection gain of the signal state pulse in the plurality of pulses may be calculated based on the quantity of pulses of the photon that are detected by the first station and the second station in the same signal state pulse and a quantity of pulses of the signal state pulses in the plurality of pulses. Likewise, the first station and the second station may determine, based on the foregoing first pulse identifier, the second pulse identifier, and an identifier of the decoy state pulse in the plurality of pulses, the quantity of pulses of the photon that are detected by the first station and the second station in the same decoy state pulse. Further, the second detection gain of the decoy state pulse in the plurality of pulses may be calculated based on the quantity of pulses of the photon that are detected by the first station and the second station in the same decoy state pulse and a quantity of pulses of the decoy state pulses in the plurality of pulses.

According to a formula $\Omega \leq 1 - P_2(\mu)Q_{\mu'}/P_2(\mu')Q_\mu$, an estimated ratio $\Omega$ of a quantity of pulses that are not affected by the PNS attack to the total quantity of the plurality of pulses can be estimated. It should be noted that, the formula that is provided in this embodiment of the present disclosure and that is used for calculating the estimated ratio $\Omega$ is merely an optional implementation, and does not constitute a limitation on the present disclosure. The first station and the second station perform error correction on the obtained key information, and use $\Omega$ to remove in privacy amplification, information that may be obtained by Eve, and finally obtain a reliable shared key.

Step S204: If the estimated ratio is less than a preset threshold, the first station performs error correction processing on the key information based on the estimated ratio to obtain the shared key of the first station and the second station.

For step S204 in this embodiment of the present disclosure, refer to step S102 in the embodiment in FIG. 1, and details are not described herein again.

Step S205: If the estimated ratio is greater than the preset threshold, the first station discards the key information carried by the photons in the plurality of pulses.

In this embodiment of the present disclosure, if the estimated ratio of the quantity of pulses affected by the PNS attack to the total quantity of the plurality of pulses is greater than the preset threshold, it indicates that the PNS attack degree is relatively high. The first station and the second station may abandon the communication, that is, the first station and the second station both discard the key information carried by the photons in the plurality of pulses.

In this embodiment of the present disclosure, the first station receives the plurality of pulses sent by the photon source, where the plurality of pulses include the signal state pulse and the decoy state pulse, the probability distribution of the photon number in the signal state pulse and the probability distribution of the photon number in the decoy state pulse are different, and the photons in the plurality of pulses carry the key information. The first station calculates the estimated ratio of the quantity of pulses that are affected by the PNS attack and that include the multi-photon in the plurality of pulses to the total quantity of the plurality of pulses. If the estimated ratio is less than the preset threshold, the first station performs error correction processing on the key information based on the estimated ratio, to obtain the shared key of the first station and the second station. In this manner, the degree to which the photon is affected by the PNS attack in the entangled state QKD can be estimated in order to perform error correction on the key information, thereby improving security of the key distribution.

Figure 3:
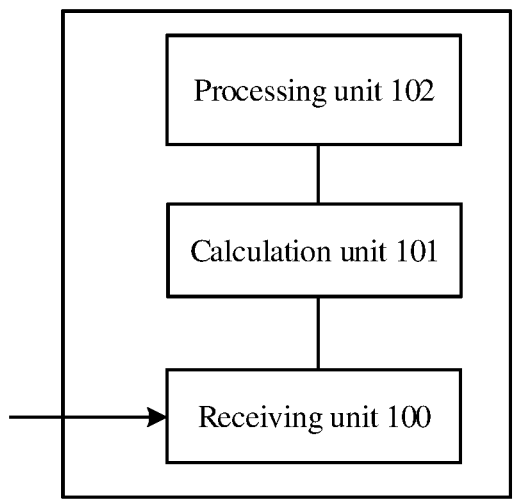
FIG. 3 is a schematic structural diagram of an information processing apparatus according to an embodiment of the present disclosure.

FIG. 3 is a schematic structural diagram of an information processing apparatus according to an embodiment of the present disclosure. The information processing apparatus is applied to a first station, and the first station performs entangled state QKD communication with a second station. As shown in the figure, the information processing apparatus in this embodiment includes a receiving unit 100, a calculation unit 101, and a processing unit 102.

The receiving unit 100 is configured to receive a plurality of pulses sent by a photon source, where the plurality of pulses include a signal state pulse and a decoy state pulse, a probability distribution of a photon number in the signal state pulse and a probability distribution of a photon number in the decoy state pulse are different, and photons in the plurality of pulses carry key information.

The calculation unit 101 is configured to calculate an estimated ratio of a quantity of pulses that are affected by a PNS attack and that include a multi-photon in the plurality of pulses to a total quantity of the plurality of pulses.

Optionally, that the calculation unit 101 calculates the estimated ratio of the quantity of pulses that are affected by the PNS attack and that include the multi-photon in the plurality of pulses to the total quantity of the plurality of pulses includes calculating a first detection gain of a signal state pulse in the plurality of pulses, where the first detection gain is a ratio of a quantity of pulses of a photon that are detected by the first station and the second station in a same signal state pulse to a total quantity of signal state pulses sent by the photon source, calculating a second detection gain of a decoy state pulse in the plurality of pulses, where the second detection gain is a ratio of a quantity of pulses of a photon that are detected by the first station and the second station in a same decoy state pulse to a total quantity of decoy state pulses sent by the photon source, and calculating, based on the first detection gain, the second detection gain, a probability of generating a plurality of photon pairs in the signal state pulse, and a probability of generating a plurality of photon pairs in the decoy state pulse, the estimated ratio of the quantity of pulses that are affected by the PNS attack and that include the multi-photon in the plurality of pulses to the total quantity of the plurality of pulses.

The processing unit 102 is configured to, if the estimated ratio is less than a preset threshold, perform error correction processing on the key information based on the estimated ratio to obtain a shared key of the first station and the second station.

Optionally, the processing unit 102 is further configured to, if the estimated ratio is greater than the preset threshold, discard the key information carried by the photons in the plurality of pulses.

Figure 4:
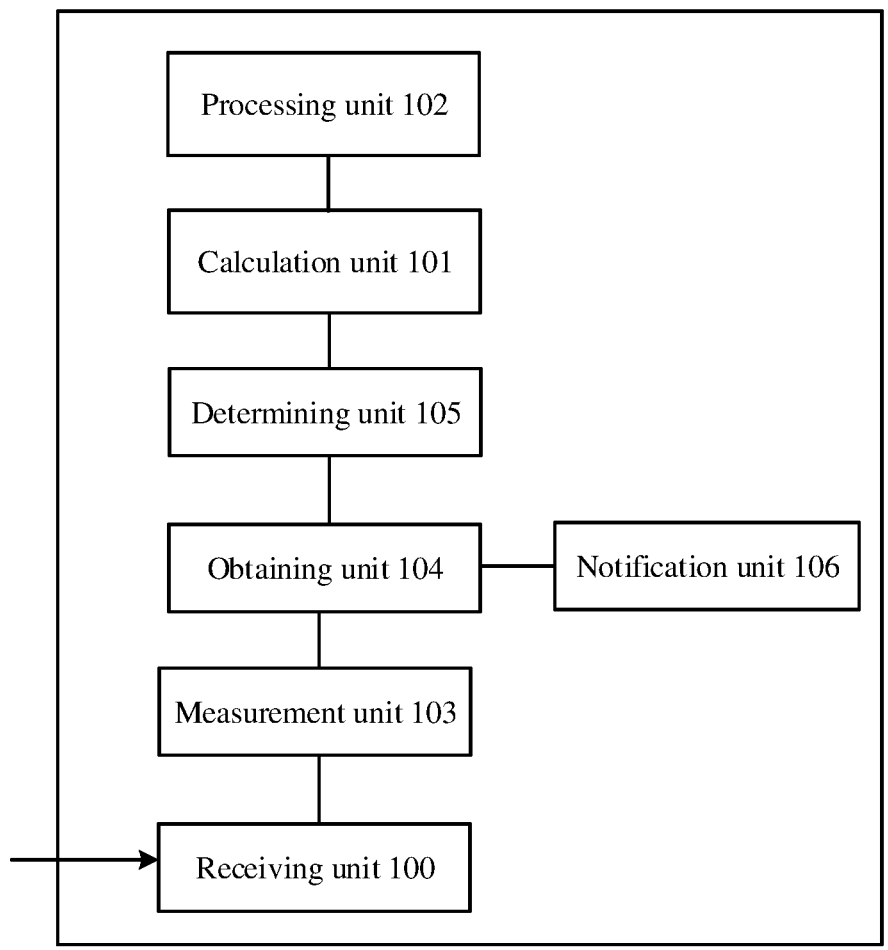
FIG. 4 is a schematic structural diagram of another information processing apparatus according to an embodiment of the present disclosure.

FIG. 4 is a schematic structural diagram of another information processing apparatus according to an embodiment of the present disclosure. As shown in FIG. 4, in addition to the structure of FIG. 3, the information processing apparatus in this embodiment of the present disclosure includes a measurement unit 103, an obtaining unit 104, a determining unit 105, and a notification unit 106.

The measurement unit 103 is configured to measure the received plurality of pulses using an orthogonal basis vector in order to determine a first pulse identifier of the photon obtained by the first station through measurement in the received plurality of pulses.

The obtaining unit 104 is configured to obtain a second pulse identifier of the photon obtained by the second station through measurement in the received plurality of pulses.

The determining unit 105 is configured to determine an identifier of the signal state pulse and an identifier of the decoy state pulse that are in the plurality of pulses.

That the calculation unit 101 calculates the first detection gain of the signal state pulse in the plurality of pulses includes determining, based on the first pulse identifier, the second pulse identifier, and the identifier of the signal state pulse in the plurality of pulses, a quantity of pulses of the photon that are detected by the first station and the second station in a same signal state pulse, and calculating the first detection gain of the signal state pulse in the plurality of pulses based on the quantity of pulses of the photon that are detected by the first station and the second station in the same signal state pulse and a quantity of pulses of the signal state pulses in the plurality of pulses.

That the calculation unit 101 calculates the second detection gain of the signal state pulse in the plurality of pulses includes determining, based on the first pulse identifier, the second pulse identifier, and the identifier of the decoy state pulse in the plurality of pulses, a quantity of pulses of the photon that are detected by the first station and the second station in a same decoy state pulse, and calculating the second detection gain of the decoy state pulse in the plurality of pulses based on the quantity of pulses of the photon that are detected by the first station and the second station in the same decoy state pulse and a quantity of pulses of the decoy state pulses in the plurality of pulses.

That the obtaining unit 104 obtains the second pulse identifier of the photon obtained by the second station through measurement in the received plurality of pulses includes listening to the second pulse identifier that is of the photon obtained by the second station through measurement in the received plurality of pulses and that is notified through a classic channel.

The notification unit 106 configured to notify the first pulse identifier to the second station through the classic channel.

Optionally, the foregoing signal state pulse is generated by performing pulse pumping on nonlinear material by the photon source using a first pumping intensity, and the foregoing decoy state pulse is generated by performing pulse pumping on the nonlinear material by the photon source using a second pumping intensity.

In this embodiment of the present disclosure, the first station receives the plurality of pulses sent by the photon source, where the plurality of pulses include the signal state pulse and the decoy state pulse, the probability distribution of the photon number in the signal state pulse and the probability distribution of the photon number in the decoy state pulse are different, and the photons in the plurality of pulses carry the key information. The first station calculates the estimated ratio of the quantity of pulses that are affected by the PNS attack and that include the multi-photon in the plurality of pulses to the total quantity of the plurality of pulses. If the estimated ratio is less than the preset threshold, the first station performs error correction processing on the key information based on the estimated ratio, to obtain the shared key of the first station and the second station. In this manner, the degree to which the photon is affected by the PNS attack in the entangled state QKD can be estimated in order to perform error correction on the key information, thereby improving security of the key distribution.

It may be understood that, for specific implementations of units in the information processing apparatus, reference may be further made to related description in the method embodiment.

Figure 5:
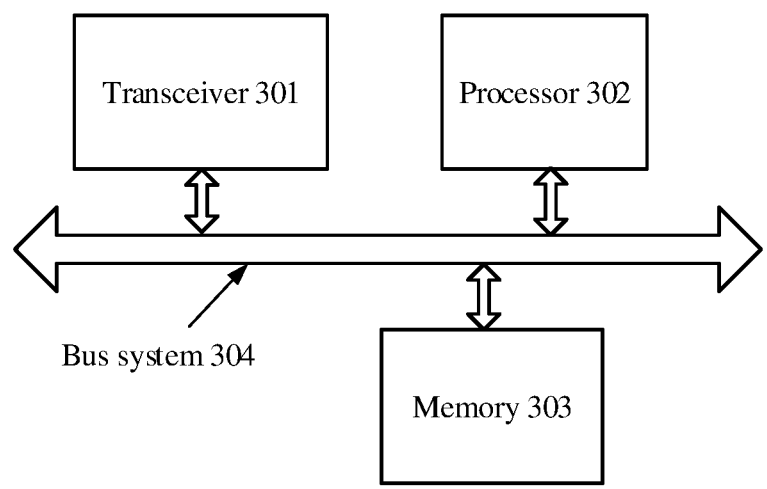
FIG. 5 is a schematic structural diagram of still another information processing apparatus according to an embodiment of the present disclosure.

FIG. 5 is a schematic structural diagram of still another information processing apparatus according to an embodiment of the present disclosure. The information processing apparatus in this embodiment can be applied to a first station, and the first station performs entangled state QKD communication with a second station. The information processing apparatus may include a transceiver 301 and a processor 302. The processor 302 is configured to control an operation of the apparatus, including transmitting data using the transceiver 301 (including receiving and/or sending). Further, the apparatus may include a memory 303, where the memory 303 may include a read-only memory (ROM) and a random access memory (RAM), and is configured to provide an instruction and data for the processor 302. The memory 303 may be integrated into the processor 302, or may be independent of the processor 302. A part of the memory 303 may further include a non-volatile RAM (NVRAM). All components of the apparatus are coupled together using a bus system 304. In addition to a data bus, the bus system 304 includes a power bus, a control bus, and a status signal bus. However, for clear description, various types of buses in the figure are marked as the bus system 304.

The processes disclosed in the embodiments of this application may be applied to the processor 302, or implemented by the processor 302. In an implementation process, each step of the process implemented by the apparatus may be completed using an integrated logical circuit of hardware in the processor 302 or an instruction in a form of software. The processor 302 may be a general purpose processor, a digital signal processor, an application-specific integrated circuit (ASIC), a field programmable gate array or another programmable logic device, a discrete gate or a transistor logic device, or a discrete hardware component, and may implement or execute methods, steps, and logic block diagrams that are disclosed in the embodiments of this application. The general purpose processor may be a microprocessor, may be any conventional processor, or the like. The steps of the methods disclosed with reference to the embodiments of this application may be directly performed and completed using a hardware processor, or may be performed and completed using a combination of hardware and software modules in the processor 302. The software module may be located in a mature storage medium in the field, such as a RAM, a flash memory, a ROM, a programmable ROM, an electrically-erasable programmable memory, or a register. The storage medium is located in the memory 303, and the processor 302 reads information in the memory 303 and implements the steps of the process indicated in the embodiments of the present disclosure in combination with hardware of the processor 302.

The transceiver 301 is configured to receive a plurality of pulses sent by a photon source, where the plurality of pulses include a signal state pulse and a decoy state pulse, a probability distribution of a photon number in the signal state pulse and a probability distribution of a photon number in the decoy state pulse are different, and photons in the plurality of pulses carry key information.

The processor 302 is configured to calculate an estimated ratio of a quantity of pulses that are affected by a PNS attack and that include a multi-photon in the plurality of pulses to a total quantity of the plurality of pulses.

The processor 302 is further configured to, if the estimated ratio is less than a preset threshold, perform error correction processing on the key information based on the estimated ratio, to obtain a shared key of the first station and the second station.

Optionally, the processor 302 is further configured to, if the estimated ratio is greater than the preset threshold, discard the key information carried by the photons in the plurality of pulses.

Optionally, that the processor 302 calculates the estimated ratio of the quantity of pulses that are affected by the PNS attack and that include the multi-photon in the plurality of pulses to the total quantity of the plurality of pulses includes calculating a first detection gain of a signal state pulse in the plurality of pulses, where the first detection gain is a ratio of a quantity of pulses of a photon that are detected by the first station and the second station in a same signal state pulse to a total quantity of signal state pulses sent by the photon source, calculating a second detection gain of a decoy state pulse in the plurality of pulses, where the second detection gain is a ratio of a quantity of pulses of a photon that are detected by the first station and the second station in a same decoy state pulse to a total quantity of decoy state pulses sent by the photon source, and calculating, based on the first detection gain, the second detection gain, a probability of generating a plurality of photon pairs in the signal state pulse, and a probability of generating a plurality of photon pairs in the decoy state pulse, the estimated ratio of the quantity of pulses that are affected by the PNS attack and that include the multi-photon in the plurality of pulses to the total quantity of the plurality of pulses.

The processor 302 is further configured to measure the received plurality of pulses using an orthogonal basis vector in order to determine a first pulse identifier of the photon obtained by the first station through measurement in the received plurality of pulses.

The processor 302 is further configured to obtain a second pulse identifier of the photon obtained by the second station through measurement in the received plurality of pulses.

The processor 302 is further configured to determine an identifier of a signal state pulse and an identifier of a decoy state pulse that are in the plurality of pulses.

That the processor 302 calculates the first detection gain of the signal state pulse in the plurality of pulses includes determining, based on the first pulse identifier, the second pulse identifier, and the identifier of the signal state pulse in the plurality of pulses, a quantity of pulses of the photon that are detected by the first station and the second station in a same signal state pulse, and calculating the first detection gain of the signal state pulse in the plurality of pulses based on the quantity of pulses of the photon that are detected by the first station and the second station in the same signal state pulse and a quantity of pulses of the signal state pulses in the plurality of pulses.

That the processor 302 calculates the second detection gain of the signal state pulse in the plurality of pulses includes determining, based on the first pulse identifier, the second pulse identifier, and the identifier of the decoy state pulse in the plurality of pulses, a quantity of pulses of the photon that are detected by the first station and the second station in a same decoy state pulse, and calculating the second detection gain of the decoy state pulse in the plurality of pulses based on the quantity of pulses of the photon that are detected by the first station and the second station in the same decoy state pulse and a quantity of pulses of the decoy state pulses in the plurality of pulses.

Optionally, that the processor 302 obtains the second pulse identifier of the photon obtained by the second station through measurement in the received plurality of pulses includes listening to the second pulse identifier that is of the photon obtained by the second station through measurement in the received plurality of pulses and that is notified through a classic channel.

The transceiver 301 is further configured to notify the first pulse identifier to the second station through the classic channel.

The foregoing signal state pulse is generated by performing pulse pumping on nonlinear material by the photon source using a first pumping intensity, and the foregoing decoy state pulse is generated by performing pulse pumping on the nonlinear material by the photon source using a second pumping intensity.

In this embodiment of the present disclosure, the first station receives the plurality of pulses sent by the photon source, where the plurality of pulses include the signal state pulse and the decoy state pulse, the probability distribution of the photon number in the signal state pulse and the probability distribution of the photon number in the decoy state pulse are different, and the photons in the plurality of pulses carry the key information. The first station calculates the estimated ratio of the quantity of pulses that are affected by the PNS attack and that include the multi-photon in the plurality of pulses to the total quantity of the plurality of pulses. If the estimated ratio is less than the preset threshold, the first station performs error correction processing on the key information based on the estimated ratio to obtain the shared key of the first station and the second station. In this manner, the degree to which the photon is affected by the PNS attack in the entangled state QKD can be estimated in order to perform error correction on the key information, thereby improving security of the key distribution.

It may be understood that, for specific implementations of components in the information processing apparatus, reference may be further made to related description in the method embodiment.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include a magnetic disk, an optical disc, a ROM, or a RAM.

Steps in the method in the embodiments of the present disclosure may be adjusted, combined, or deleted according to an actual requirement.

Units in the information processing apparatus in the embodiments of the present disclosure may be adjusted, combined, or deleted according to an actual requirement.

The component such as the microcontroller in the embodiments of the present disclosure may be implemented by a universal integrated circuit, such as a central processing unit (CPU), or by an ASIC.

What are disclosed above are merely specific embodiments of the present disclosure, and certainly are not intended to limit the scope of the claims of the present disclosure. Therefore, equivalent variations made in accordance with the claims of the present disclosure shall fall within the scope of the present disclosure.

What is claimed is:

1. An information processing method for an entangled state quantum key distribution communication implemented by a first station, comprising:
   receiving a plurality of pulses comprising photons from a photon source, wherein the plurality of pulses comprise a signal state pulse and a decoy state pulse, wherein a probability distribution of a photon number in the signal state pulse and a probability distribution of a photon number in the decoy state pulse are different, and wherein the photons carry key information;
   calculating an estimated ratio of a quantity of pulses of the plurality of pulses affected by a photon-number splitting (PNS) attack to a total quantity of the plurality of pulses, wherein the plurality of pulses that are affected by the PNS attack comprise a multi-photon;
   comparing the estimated ratio with a preset threshold ratio; and
   performing error correction processing on the key information to obtain a shared key of the first station and a second station based on the estimated ratio being less than the preset threshold ratio so as to permit secure key distribution between the first station and the second station.

2. The information processing method of claim 1, wherein the estimated ratio is greater than the preset threshold ratio, and wherein the information processing method further comprises discarding the key information carried by the photons in the plurality of pulses.

3. The information processing method of claim 1, wherein calculating the estimated ratio comprises:
   calculating a first detection gain of the signal state pulse, wherein the first detection gain is a ratio of a quantity of pulses of a photon of the first station and the second station in the same signal state pulse to a total quantity of signal state pulses received from the photon source;
   calculating a second detection gain of the decoy state pulse in the plurality of pulses, wherein the second detection gain is a ratio of a quantity of pulses of the photon of the first station and the second station in the same decoy state pulse to a total quantity of decoy state pulses received from the photon source; and
   calculating the estimated ratio based on the first detection gain, the second detection gain, a probability of generating a plurality of photon pairs in the signal state pulse, and a probability of generating a plurality of photon pairs in the decoy state pulse.

4. The information processing method of claim 3, wherein before calculating the first detection gain, the information processing method further comprises:
   measuring the received pulses using an orthogonal basis vector;

obtaining a first pulse identifier of the photon obtained by the first station through a first measurement in the plurality of pulses;

obtaining a second pulse identifier of the photon obtained by the second station through a second measurement in the plurality of pulses; and determining an identifier of the signal state pulse and an identifier of the decoy state pulse in the plurality of pulses, wherein calculating the first detection gain of the signal state pulse in the plurality of pulses comprises:

determining, based on the first pulse identifier, each of the second pulse identifier, the identifier of the signal state pulse in the plurality of pulses, the quantity of pulses of the photon detected by the first station and the second station in the same signal state pulse; and calculating the first detection gain of the signal state pulse in the plurality of pulses based on the quantity of pulses of the photon detected by the first station and the second station in the same signal state pulse and the total quantity of the signal state pulses in the plurality of pulses, and wherein calculating the second detection gain of the decoy state pulse in the plurality of pulses comprises:

determining the quantity of pulses of the photon detected by the first station and the second station in the same decoy state pulse based on the first pulse identifier, the second pulse identifier, and the identifier of the decoy state pulse in the plurality of pulses; and calculating the second detection gain of the decoy state pulse in the plurality of pulses based on the quantity of pulses of the photon detected by the first station and the second station in the same decoy state pulse and the total quantity of the decoy state pulses in the plurality of pulses.

5. The information processing method of claim 4, wherein obtaining the second pulse identifier comprises listening to the second pulse identifier through a classic channel, and wherein the information processing method further comprises notifying the second station of the first pulse identifier through the classic channel.

6. The information processing method of claim 1, further comprising receiving the signal state pulse from a first pulse pumping on nonlinear material through a first pumping intensity, and wherein the decoy state pulse comprises a second pulse pumping on the nonlinear material using a second pumping intensity.

7. An information processing apparatus for an entangled state quantum key distribution communication implemented by a first station, comprising:

a receiver configured to receive a plurality of pulses from a photon source, wherein the plurality of pulses comprise a signal state pulse and a decoy state pulse, wherein a probability distribution of a photon number in the signal state pulse and a probability distribution of a photon number in the decoy state pulse are different, and wherein photons in the plurality of pulses carry key information; and a processor coupled to the receiver and configured to:

calculate an estimated ratio of a quantity of pulses of the plurality of pulses affected by a photon-number splitting (PNS) attack to a total quantity of the plurality of pulses, wherein the received pulses that are affected by the PNS attack comprise a multi-photon; and perform error correction processing on the key information based on the estimated ratio to obtain a shared key of the first station and a second station when the estimated ratio is less than a preset threshold ratio.

8. The information processing apparatus of claim 7, wherein the processor is further configured to discard the key information carried by the photons in the plurality of pulses based on the estimated ratio being greater than the preset threshold ratio.

9. The information processing apparatus of claim 7, wherein when calculating the estimated ratio, the processor is further configured to:

calculate a first detection gain of the signal state pulse, wherein the first detection gain is a ratio of a quantity of pulses of a photon of the first station and the second station in a same signal state pulse to a total quantity of signal state pulses received from the photon source;

calculate a second detection gain of the decoy state pulse in the plurality of pulses, wherein the second detection gain is a ratio of a quantity of pulses of the photon of the first station and the second station in the same decoy state pulse to a total quantity of decoy state pulses received from the photon source; and calculate the estimated ratio based on the first detection gain, the second detection gain, a probability of generating a plurality of photon pairs in the signal state pulse, and a probability of generating a plurality of photon pairs in the decoy state pulse.

10. The information processing apparatus of claim 9, wherein the processor is further configured to:

measure the plurality of pulses using an orthogonal basis vector;

obtain a first pulse identifier of the photon obtained by the first station through a first measurement in the plurality of pulses;

obtain a second pulse identifier of the photon of the second station through a second measurement in the plurality of pulses; and determine an identifier of the signal state pulse and an identifier of the decoy state pulse in the plurality of pulses, wherein when calculating the first detection gain of the signal state pulse in the plurality of pulses specifically comprises, the processor is further configured to:

determine, based on the first pulse identifier, each of the second pulse identifier, the identifier of the signal state pulse in the plurality of pulses, and the quantity of pulses of the photon detected by the first station and the second station in the same signal state pulse; and calculate the first detection gain of the signal state pulse in the plurality of pulses based on the quantity of pulses of the photon detected by the first station and the second station in the same signal state pulse and the total quantity of the signal state pulses in the plurality of pulses, and wherein the processor is further configured to further calculate the second detection gain of the signal state pulse in the plurality of pulses by:

determining, based on the first pulse identifier, the second pulse identifier, and the identifier of the decoy state pulse in the plurality of pulses, the quantity of pulses of the photon detected by the first station and the second station in the same decoy state pulse; and calculating the second detection gain of the decoy state pulse in the plurality of pulses based on the quantity of pulses of the photon detected by the first station and the second station in the same decoy state pulse and the total quantity of the decoy state pulses in the plurality of pulses.

11. The information processing apparatus of claim 10, wherein when obtaining the second pulse identifier of the photon obtained by the second station, the processor is further configured to listen to the second pulse identifier of the photon obtained by the second station through the second measurement in the plurality of pulses that is notified through a classic channel.

12. The information processing apparatus of claim 11, wherein the processor is further configured to notify the second station of the first pulse identifier through the classic channel.

13. The information processing apparatus of claim 7, wherein the receiver is configured to:
  receive the signal state pulse according to a first pulse pumping on a nonlinear material using a first pumping intensity; and
  receive the decoy state pulse according to a second pulse pumping on the nonlinear material using a second pumping intensity.

14. A non-transitory computer readable storage medium having a computer usable program code, wherein a computer device on a first station executes the computer usable program code to:
  receive a plurality of pulses from a photon source, wherein the plurality of pulses comprise a signal state pulse and a decoy state pulse, wherein a probability distribution of a photon number in the signal state pulse and a probability distribution of a photon number in the decoy state pulse are different, and wherein photons in the plurality of pulses carry key information;
  calculate an estimated ratio of a quantity of pulses of the plurality of pulses affected by a photon-number splitting (PNS) attack to a total quantity of the plurality of pulses, wherein the plurality of pulses affected by the PNS attack comprise a multi-photon; and
  perform error correction processing on the key information to obtain a shared key of the first station and a second station based on the estimated ratio being less than a preset threshold ratio so as to permit secure key distribution between the first station and the second station.

15. The non-transitory computer readable storage medium of claim 14, wherein the computer device further executes the computer usable program code to discard the key information carried by the photons in the plurality of pulses based on the estimated ratio being greater than the preset threshold.

16. The non-transitory computer readable storage medium of claim 14, wherein when calculating the estimated ratio, the computer device further executes the computer usable program code to:
  calculate a first detection gain of the signal state pulse, wherein the first detection gain is a ratio of quantity of pulses of a photon of the first station and the second station in the same signal state pulse to a total quantity of signal state pulses received from the photon source;
  calculate a second detection gain of the decoy state pulse, wherein the second detection gain is a ratio of a quantity of pulses of the photon of the first station and the second station in the same decoy state pulse to a total quantity of decoy state pulses received from the photon source; and calculate the estimated ratio based on the first detection gain, the second detection gain, a probability of generating a plurality of photon pairs in the signal state pulse, and a probability of generating a plurality of photon pairs in the decoy state pulse.

17. The non-transitory computer readable storage medium of claim 16, wherein the computer device further executes the computer usable program code to:
  measure the plurality of pulses using an orthogonal basis vector;
  obtain a first pulse identifier of the photon obtained by the first station through a first measurement in the plurality of pulses;
  obtain a second pulse identifier of the photon obtained by the second station through a second measurement in the plurality of pulses; and
  determine an identifier of the signal state pulse and an identifier of the decoy state pulse in the plurality of pulses, wherein the computer device further executes the computer usable program code to calculate the first detection gain of the signal state pulse in the pulses by:
    determining the quantity of pulses of the photon detected by the first station and the second station in the same signal state pulse based on the first pulse identifier, the second pulse identifier, and the identifier of the signal state pulse in the plurality of pulses; and
    calculating the first detection gain of the signal state pulse in the plurality of pulses based on the quantity of pulses of the photon detected by the first station and the second station in the same signal state pulse and the total quantity of the signal state pulses in the pulses, and wherein the computer device further executes the computer usable program code to calculate the second detection gain of the signal state pulse in the pulses by:
    determining the quantity of pulses of the photon detected by the first station and the second station in the same decoy state pulse based on the first pulse identifier, the second pulse identifier, and the identifier of the decoy state pulse in the plurality of pulses; and
    calculating the second detection gain of the decoy state pulse in the pulses based on the quantity of pulses of the photon detected by the first station and the second station in the same decoy state pulse and the total quantity of the decoy state pulses in the plurality of pulses.

18. The non-transitory computer readable storage medium of claim 17, wherein when obtaining the second pulse identifier of the photon obtained by the second station, the computer device further executes the computer usable program code to listen to the second pulse identifier of the photon obtained by the second station through the second measurement in the pulses that is notified through a classic channel.

19. The non-transitory computer readable storage medium of claim 18, wherein the computer device further executes the computer usable program code to notify the second station of the first pulse identifier through the classic channel.

20. The non-transitory computer readable storage medium of claim 14, wherein the signal state pulse is received according to a first pulse pumping on a nonlinear material using a first pumping intensity, and wherein the decoy state pulse is received according to a second pulse pumping on the nonlinear material using a second pumping intensity.

* * * * *